United States Patent
Yoo

(10) Patent No.: US 11,989,730 B2
(45) Date of Patent: May 21, 2024

(54) VIRTUAL CODE-BASED TRANSACTION SYSTEM, METHOD AND PROGRAM

(71) Applicant: SSENSTONE INC., Seoul (KR)

(72) Inventor: Chang Hun Yoo, Seoul (KR)

(73) Assignee: SSENSTONE INC., Seoul (KR)

( * ) Notice: Subject to any disclaimer, the term of this patent is extended or adjusted under 35 U.S.C. 154(b) by 155 days.

(21) Appl. No.: 17/680,200

(22) Filed: Feb. 24, 2022

(65) Prior Publication Data
US 2022/0180366 A1 Jun. 9, 2022

Related U.S. Application Data

(63) Continuation of application No. PCT/KR2020/011518, filed on Aug. 28, 2020.

(30) Foreign Application Priority Data

Aug. 30, 2019 (KR) .................. 10-2019-0107065
Aug. 27, 2020 (KR) .................. 10-2020-0108738

(51) Int. Cl.
*G06Q 20/40* (2012.01)
*G06Q 20/38* (2012.01)

(52) U.S. Cl.
CPC ....... *G06Q 20/4014* (2013.01); *G06Q 20/389* (2013.01)

(58) Field of Classification Search
None
See application file for complete search history.

(56) References Cited

U.S. PATENT DOCUMENTS 10,521,777 B2 * 12/2019 Zhou .................. G06Q 20/3276
2001/0029485 A1 * 10/2001 Brody .................. G06Q 20/04
705/39

(Continued)

FOREIGN PATENT DOCUMENTS

CN 106529938 A 3/2017
EP 3 644 257 A1 4/2020

(Continued)

OTHER PUBLICATIONS

"Russell/Norvig, Solving problems by searching, Chapter 3 and 4, Artificial Intelligence" (Year: 2010).*

(Continued)

*Primary Examiner* — Kito R Robinson
*Assistant Examiner* — Toan Duc Bui
(74) *Attorney, Agent, or Firm* — Studebaker & Brackett PC

(57) ABSTRACT

The present invention provides a virtual code-based transaction system, method and program, wherein the method includes a virtual code reception step in which a virtual code verification means receives a virtual code, and the virtual code is generated by a virtual code generation function included in a virtual code generation means, searching, by the virtual code verification means, for a storage location of a User Identification (UID) in the virtual code, searching, by the virtual code verification means, for control command information stored by matching the searched UID, and performing a control command based on the extracted control command information, wherein the virtual code verification means stores a plurality of UIDs and changes control command information matched to each of the plurality of UIDs every preset period.

18 Claims, 7 Drawing Sheets

(56) References Cited

U.S. PATENT DOCUMENTS

| | | | |
|---|---|---|---|
| 2016/0063499 A1* | 3/2016 | Sugiyama | G06Q 20/407 |
| | | | 705/23 |
| 2018/0065156 A1* | 3/2018 | Winkle | B07C 5/342 |
| 2018/0330367 A1* | 11/2018 | Sharma | G06Q 20/34 |
| 2019/0156338 A1 | 5/2019 | Salama et al. | |
| 2019/0295064 A1* | 9/2019 | Malo | G06Q 20/201 |
| 2020/0242232 A1* | 7/2020 | Machani | H04L 63/0884 |
| 2023/0283463 A1* | 9/2023 | Shaffer | H04L 9/30 |
| | | | 713/171 |

FOREIGN PATENT DOCUMENTS

| | | |
|---|---|---|
| JP | 2007-179214 A | 7/2007 |
| JP | 2012-133684 A | 7/2012 |
| JP | 2017-033190 A | 2/2017 |
| JP | 2019-032804 A | 2/2019 |
| KR | 10-1316466 B1 | 10/2013 |
| KR | 10-2016-0035028 A | 3/2016 |
| KR | 10-2016-0036471 A | 4/2016 |
| KR | 10-2019-0016884 A | 2/2019 |
| KR | 10-2019-0018463 A | 2/2019 |

OTHER PUBLICATIONS

International Search Report issued in PCT/KR2020/011518; dated Dec. 4, 2020.

An Office Action mailed by the Korean Intellectual Property Office dated Apr. 25, 2022, which corresponds to Korean Patent Application No. 10-2020-0108738 and is related to U.S. Appl. No. 17/680,200; with English language translation.

An Office Action mailed by the Intellectual Property Office of Singapore dated Mar. 10, 2023, which corresponds to Singapore Patent Application No. 11202108944T and is related to U.S. Appl. No. 17/680,200.

The extended European search report issued by the European Patent Office dated Aug. 10, 2023, which corresponds to European Patent Application No. 20859148.7-1218 and is related to U.S. Appl. No. 17/680,200.

An Office Action mailed by the Japanese Patent Office dated Jul. 4, 2023, which corresponds to Japanese Patent Application No. 2022-513560 and is related to U.S. Appl. No. 17/680,200; with English language translation.

\* cited by examiner

VIRTUAL CODE-BASED TRANSACTION SYSTEM, METHOD AND PROGRAM

CROSS-REFERENCE TO RELATED APPLICATION

The present application is a continuation of International Patent Application No. PCT/KR2020/011518, filed on Aug. 28, 2020, which is based upon and claims the benefit of priority to Korean Patent Application No. 10-2019-0107065 filed on Aug. 30, 2019 and Korean Patent Application No. 10-2020-0108738 filed on Aug. 27, 2020. The disclosures of the above-listed applications are hereby incorporated by reference herein in their entirety.

BACKGROUND

1. Technical Field

The present invention relates to a transaction method using a virtual code.

2. Description of Related Art

Code-type data is used in many areas. In addition to card numbers and account numbers used for payment, IPIN numbers for user identification, resident registration numbers, etc. are code-type data.

However, many leaks occur in the process of using such code data. As a virtual code used as a substitute currency is leaked and others use it illegally, the buyer may suffer damage, and the seller may suffer damage as the illegal virtual code is forged and used.

There have been many attempts to use the temporarily generated virtual code to prevent the code constituting the virtual code and the virtual code generation rule from being leaked, but in order to search for the real code corresponding to the virtual code, data for identifying the user is required. For example, in the case of One Time Password (OTP), the code is changed every hour and generated, but it is difficult to apply to various areas because a login procedure is required to determine the algorithm assigned to the user.

In addition, when communication is difficult in the device for verifying the validity of the virtual code, there is a problem in that it is difficult to verify the validity of the virtual code.

Therefore, there is a need for an invention that can determine the validity of a virtual code and utilize it based on a virtual code that changes in real time without providing identification information on a corresponding user or device corresponding to the virtual code.

SUMMARY

An object to be solved by the present invention is to provide a method and system for preventing duplicate virtual codes issued by a seller after a transaction.

In addition, an object to be solved by the present invention is to provide a method and system for giving a virtual code issued by a seller an expiration date after a transaction so that the purchaser cannot use it after a certain period of time after purchasing the virtual code.

In addition, an object to be solved by the present invention is to provide a method and system for preventing the corresponding rule from being utilized after a certain period of time, even if the token generation rule is leaked.

The problem to be solved by the present invention is not limited to the problems mentioned above, and other problems that are not mentioned will be clearly understood by those skilled in the art from the following description.

The present invention for solving the above problems provides a transaction method using virtual code, the method including a virtual code reception step in which a virtual code verification means receives a virtual code, and the virtual code is generated by a virtual code generation function included in a virtual code generation means, searching, by the virtual code verification means, a storage location of a User Identification (UID) in the virtual code, searching, by the virtual code verification means, control command information stored by matching the searched UID, and performing a control command based on the extracted control command information, wherein the virtual code verification means stores a plurality of UIDs and changes control command information matched to each of the plurality of UIDs every preset period.

In one embodiment, the present invention includes, for each preset period, updating, by the virtual code verification means, period information stored in the virtual code verification means, wherein, when the virtual code verification means updates the period information, the control command information matched to each of the plurality of UIDs and stored is matched to different UIDs and stored.

In one embodiment, the present invention further includes verifying, by the virtual code verification means, the virtual code using the stored period information.

In one embodiment, the verifying of the virtual code includes extracting period information from the virtual code by the virtual code verification means, and verifying, by the virtual code verification means, the validity of the virtual code by comparing the extracted period information with the period information stored in the virtual code verification means.

In one embodiment, the updating, by the virtual code verification means, the period information stored in the virtual code verification means includes updating, by the virtual code verification means, period information from a first period to a second period, and changing, by the virtual code verification means, a storage location of control command information so that control command information stored by matching a specific UID in the first period matches a UID different from the specific UID in the second period.

In one embodiment, the verifying of the virtual code includes, if the extracted period information does not match the second period stored in the virtual code verification means, checking, by the virtual code verification means, whether the extracted period information matches the first period.

In an embodiment, if the extracted period information and the first period match, the performing of the control command based on the extracted control command information includes performing, by the virtual code verification means, a control command corresponding to the stored control command information by matching the extracted UID in the first period.

In an embodiment, the virtual code includes a first code for setting a starting point of the storage location search, and a second code for setting a search path from the starting point to the storage location according to a specific search method, and the first code and the second code may be changed for each unit count.

In an embodiment, the verifying, by the virtual code verification means, the virtual code includes extracting, by the virtual code verification means, a unique value of the virtual code verification means from the virtual code, and verifying, by the virtual code verification means, the validity of the virtual code by comparing the extracted unique value with the unique value stored in the virtual code verification means.

In addition, the present invention provides a transaction program using a virtual code, which is combined with a computer, which is hardware, and stored in a medium to execute the method described above.

In addition, provided is a virtual code generation device. Specifically, the present invention includes a detail code generation unit configured to match control command information corresponding to a purchase request of a user among a plurality of User Identifications (UIDs) stored in the virtual code generation device and generate one or more detail codes based on the stored UID, a virtual code generation unit configured to generate a virtual code by combining the one or more detail codes using a virtual code generation function, and a virtual code provision unit configured to transmit the virtual code to a virtual code reception device or a virtual code verification device, wherein the virtual code generation device stores a plurality of UIDs and changes control command information matched to each of the plurality of UIDs every preset period.

In an embodiment, the virtual code generation device matches and stores control command information stored by matching each of the plurality of UIDs to different UIDs in the same period as the virtual code verification device.

In addition, provided is a virtual code verification device for transactions. Specifically, the present invention includes a virtual code reception unit configured to receive a virtual code, a detail code extraction unit configured to extract a detail code from the virtual code, a storage location search unit configured to search a storage location of a User Identification (UID) based on the detail code, a control command information extraction unit configured to match the searched UID and extract stored control command information, a virtual code verification unit configured to verify the virtual code, and a control unit configured to perform control based on the extracted control command information, wherein the virtual code verification device stores a plurality of UIDs and changes control command information matched to each of the plurality of UIDs every preset period.

In an embodiment, the virtual code verification device matches and stores control command information stored by matching each of the plurality of UIDs to different UIDs in the same period as the virtual code verification device.

In an embodiment, the detail code extraction unit extracts period information from the virtual code, wherein the virtual code verification unit compares the extracted period information with the period information stored in the virtual code verification means to verify the validity of the virtual code.

DETAILED DESCRIPTION

Figure 1:
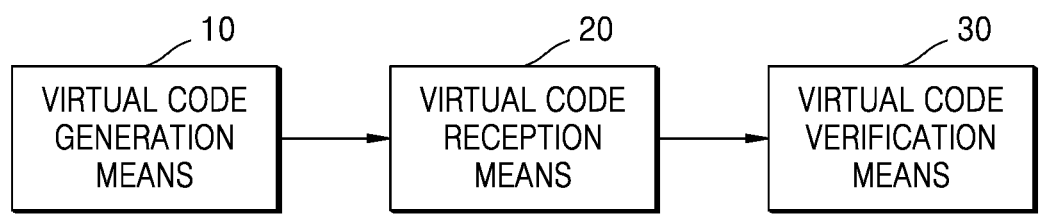
FIG. 1 is a block diagram of a transaction system using a virtual code according to an embodiment of the present invention.

Advantages and features of the present invention, and a method of achieving them, will become apparent with reference to the embodiments described below in detail in conjunction with the accompanying drawings. However, the present invention is not limited to the embodiments disclosed below, but may be implemented in various different forms, and only these embodiments are provided so that the disclosure of the present invention is complete, and to fully inform those of ordinary skill in the scope of the invention in the technical field to which the present invention belongs, and the invention is only defined by the scope of the claims.

The terms used in this specification are for describing exemplary embodiments and are not intended to limit the present invention. In this specification, the singular form also includes the plural form unless specifically stated in the phrase. As used herein, "comprises" and/or "comprising" does not exclude the presence or addition of one or more other components in addition to the stated components. Like reference numerals refer to like elements throughout, and "and/or" includes each and every combination of one or more of the mentioned components. Although "first", "second", etc. are used to describe various elements, it is apparent that these components are not limited by these terms. These terms are only used to distinguish one component from another. Therefore, it is apparent that the first component mentioned below may be the second component within the spirit of the present invention.

Unless otherwise defined, all terms (including technical and scientific terms) used herein may be used with the meaning commonly understood by those of ordinary skill in the art to which the present invention belongs. In addition, terms defined in a commonly used dictionary are not to be interpreted ideally or excessively unless clearly defined in particular.

In the present specification, 'character' is a component constituting a code, and includes all or part of uppercase letters, lowercase letters, numbers, and special characters.

In this specification, 'code' means a character string in which characters are listed.

In the present specification, 'virtual code' is a code generated by a virtual code generating means, and refers to a code that is issued by a seller through a transaction action, and allows the purchaser to use the purchased product by input from the virtual code verification means. That is, the 'virtual code' means a virtual code temporarily assigned to each unit count so that user information can be extracted and verified.

In this specification, 'detail code' means some code included in the virtual code.

In the present specification, a 'unit count' is a unit defined as being set at a specific time interval and changing as the time interval elapses. For example, 1 count may be set to a specific time interval (e.g., 1.5 seconds) and used.

In this specification, a 'virtual code generation function' refers to a function used to generate a virtual code.

In this specification, 'roll movement' means that the object performs translational motion while rotating. In other words, 'roll movement' is moving while performing both rotational and translational movements and means that each point of the rotating object moves while being in contact with the moving axis in turn.

In this specification, 'user identification (UID)' refers to a unique code-type value that is not duplicated and is assigned for each control command to identify the control command.

In this specification, a 'storage location' means a point (count) on a track corresponding to a time point when UID registration is requested by a user.

In the present specification, 'control command information' is information stored by matching the UID storage location, and defines control that can be performed by the virtual code verification device. As an embodiment, when the device performing control corresponding to the control command information is a meter, the control command information may be a charge amount of power, gas, or water. The meter performs control so that electricity, gas, water, etc. can be used as much as the amount of charge defined by the control command information. However, the type of control defined by the control command information is not limited thereto.

In the present specification, the 'matching relationship' refers to a relationship in which a plurality of UIDs and a plurality of control command information are matched with each other and stored. In this case, the number of UIDs may be greater than the number of pieces of control command information, and some of the plurality of UIDs may not match the control command information.

Hereinafter, embodiments of the present invention will be described in detail with reference to the accompanying drawings.

FIG. 1 is a block diagram of a transaction system using a virtual code according to an embodiment of the present invention.

As shown in FIG. 1, the transaction system includes a virtual code generation means 10, a virtual code reception means 20, and a virtual code verification means 30.

The virtual code generation means 10 means a device in which a dedicated program for generating a virtual code is built-in or installed. More specifically, the virtual code generation means 10 may be a seller server. A user purchases a predetermined item from a seller server.

For example, a user may purchase usage rights for electricity, gas and water through a seller server. The seller server issues a virtual code so that the user can use electricity, gas, water, etc. according to the amount purchased.

As another example, a user can purchase data usage rights through a seller server. The seller server issues a virtual code so that the user can use the data as much as the purchased amount.

The user allows the seller server to transmit the issued virtual code to the virtual code verification means 30, or transmit the issued virtual code to a separate virtual code reception means 20 (e.g., a user's mobile terminal). The user may directly input the virtual code displayed on the virtual code reception means 20 to the virtual code verification means 30, or transmit the virtual code to the virtual code verification means 30 through wireless communication between the virtual code reception means 20 and the virtual code verification means 30.

The virtual code verification means 30 receives the virtual code, and after extracting the usage amount for the electricity, gas and water purchased by the user using the virtual code, allows the user to use electricity, gas, water, etc. by the usage amount. For example, the virtual code verification means 30 may be an electricity meter, a gas meter, a water meter, or the like. As another example, the virtual code verification means 30 may be a mobile terminal capable of wireless communication.

Hereinafter, the above-described configurations will be described in detail.

The virtual code generation means 10 may be initially registered in the virtual code verification means 30. The virtual code verification means 30 registers users by transmitting information related to the virtual code verification means 30 to the virtual code generation means 10. However, the present invention is not limited thereto, and the virtual code verification means 30 may be in a state registered with the virtual code generation means 10 when shipped from the factory.

The virtual code generation means 10 generates a virtual code using a UID. Here, the UID may be information stored in both the virtual code generation means 10 and the virtual code verification means 30, and control command information may be matched and stored in the storage location of the UID.

On the other hand, the virtual code generation means 10 generates a virtual code by using the UID including the virtual code generation function. For example, the virtual code generation means 10 generates a virtual code by using the UID.

As a specific example, the virtual code generation means 10 may receive a unique value of the virtual code verification means 30 from the user when registering the virtual code verification means 30, or store the factory unique value of the virtual code verification means 30 in the virtual code generation means 10. As the unique value of the virtual code verification means 30 is registered in the virtual code generation means 10, the virtual code generation means 10 updates the virtual code generation function. Here, each of the virtual code generation means 10 and the virtual code verification means 30 may include the same virtual code generation function, or the virtual code verification means 30 may include a storage location search algorithm corresponding to the virtual code generation function included in the virtual code generation means 10.

The virtual code generation means 10 matches and stores control command information to each of a plurality of UIDs corresponding to the registered virtual code verification means 30. Here, the control command information may be information defining usage rights for electricity, gas and water purchased by the user. For example, the control command information may be a usage amount for electricity, gas and water.

In an embodiment, control command information defining different usage amounts may be matched and stored in each of the plurality of UIDs. The virtual code generation means 10 generates a virtual code by using the UID matched to the control command information defining the usage amount purchased by the user.

The virtual code generation means 10 changes control command information matched to each of a plurality of UIDs at a preset period. More specifically, control command information is matched and stored in some of the plurality of UIDs, and control command information may not be matched and stored in the remaining part. The virtual code generation means 10 changes the matching relationship between the UID and control command information in a certain period. Accordingly, the control command information can be matched and stored in the UID where the control command information was not matched and stored, and the control command information may not be matched and stored with the UID in which the control command information was matched and stored.

For example, the virtual code generation means 10 changes the matching relationship between the UID and control command information in one week period. In this case, the same control command information is not matched to the same UID before and after the matching relationship change.

Accordingly, even if the user purchases the same amount of usage rights, according to a time point at which the user makes a purchase request, the virtual code generation means 10 generates a virtual code using different UIDs. A method, performed by the virtual code generation means 10, of generating a virtual code using the UID will be described later.

The virtual code generation means 10 may deliver the virtual code to the virtual code reception means 20. The user may directly input, to the virtual code verification means 30, the virtual code provided to the virtual code reception means 20.

In another embodiment, the user may transmit, to the virtual code verification means, the virtual code transmitted to the virtual code reception means 20 through short-range communication (e.g., NFC communication).

The communication unit included in the virtual code reception means 20 communicates with the virtual code generation means 10 and the virtual code verification means 30 to transmit and receive virtual codes. Here, as the wireless communication method of the communication unit, in addition to Near Field Communication (NFC), Bluetooth, Bluetooth Low Energy (BLE), Beacon, Radio Frequency Identification (RFID), Infrared Data Association (IrDA), Ultra Wideband (UWB), ZigBee, etc. may be used.

As a specific example, the communication unit may be a near field communication (NFC) communication unit (e.g., an NFC antenna) connected to an IC chip. For example, the user of the virtual code reception means 20 may transmit the received virtual code to the virtual code verification means 30 by tagging the virtual code verification means 30.

As another example, the virtual code reception means 20 receives the virtual code (e.g., receive as a text message) and displays the received virtual code on a display unit included in the virtual code reception means 20. The user of the virtual code reception means 20 may transmit the virtual code by inputting the virtual code displayed on the display unit to the virtual code verification means 30.

However, the virtual code reception means 20 is not necessarily required. In an embodiment, the virtual code generation means 10 may include a printing means capable of printing the issued virtual code. The user may input the virtual code to the virtual code verification means 30 using the printed virtual code. At this time, the virtual code verification means 30 may be provided with a separate input means. The virtual code verification means 30 is a device that controls the use of electricity, gas, water, etc., and receives the virtual code from the virtual code generation means 10, the virtual code reception means 20 or the user, and grants usage rights of electricity, gas, water, and data. Users can be given usage rights for electricity, gas, water, data, etc. by using a virtual code.

The virtual code verification means 30 receives the virtual code, and searches the storage location of the UID from the virtual code. Thereafter, the virtual code verification means 30 extracts the stored control command information matched to and stored in the storage location of the found UID, and grants usage rights corresponding to the extracted control command information. A method, performed by the virtual code verification means 30, of searching the storage location of the UID from the virtual code will be described later.

The virtual code verification means 30 searches the storage location of the UID, and then extracts the stored control command information matched to and stored in the UID. Here, the virtual code verification means 30 changes the stored control command information by matching the UID every preset period. More specifically, a plurality of UIDs are stored in the virtual code verification means 30. The plurality of UIDs are the same UIDs as the plurality of UIDs stored in the virtual code generation means 10. Control command information defining different usage amounts may be matched and stored in each of the plurality of UIDs.

The virtual code verification means 30 changes the control command information matched to each of the plurality of UIDs in a preset period. More specifically, control command information is matched and stored in some of the plurality of UIDs, and control command information may not be matched and stored in the remaining part. The virtual code verification means 30 changes the matching relationship between the UID and the control command information at a certain period. Accordingly, the control command information can be matched and stored in the UID where the control command information was not matched and stored, and the control command information may not be matched and stored with the UID in which the control command information was matched and stored.

As described above, each of the virtual code generation means 10 and the virtual code verification means 30 changes the matching relationship between the UID and the control command information in a preset period. At this time, because the virtual code generation means 10 and the virtual code verification means 30 change the matching relationship according to the same rule, at the same time point, the control command information matched to the UID stored in the virtual code generation means 10 and the control command information matched to the UID stored in the virtual code verification means 30 are identical to each other.

The virtual code verification means 30 includes a communication unit, and the communication unit communicates with the virtual code generation means 10 and the virtual code reception means 20 so as to receive the virtual code. Here, as the wireless communication method of the communication unit, in addition to Near Field Communication (NFC), Bluetooth, Bluetooth Low Energy (BLE), Beacon, Radio Frequency Identification (RFID), Infrared Data Association (IrDA), Ultra Wideband (UWB), ZigBee, etc. may be used. However, the present invention is not limited thereto, and the virtual code verification means 30 may include a communication module for remote wireless communication. However, the virtual code verification means 30 does not necessarily include a communication unit.

Figure 2:
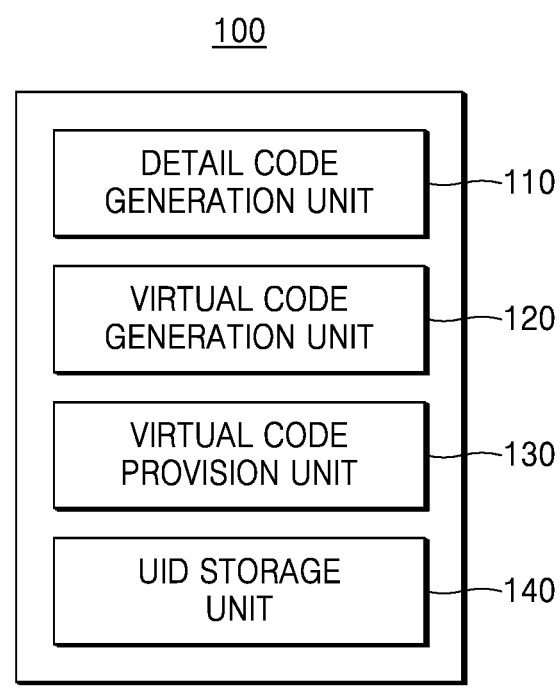
FIG. 2 is a block diagram of a virtual code generation device according to an embodiment of the present invention.

FIG. 2 is a block diagram of a virtual code generation device according to an embodiment of the present invention.

As shown in FIG. 2, a virtual code generation device 100 includes a detail code generation unit 110, a virtual code generation unit 120, a virtual code provision unit 130, and a UID storage unit 140.

The virtual code generation device 100, in one embodiment, may be a server of a seller that supplies electricity, gas, and water. The virtual code generation device 100 is the virtual code generation means 10 described above.

The detail code generation unit 110 generates one or more detailed codes based on the UID. Specifically, the virtual code generation device 100 receives a virtual code generation request from the user. Here, the virtual code generation request may be a purchase request received from the user.

If the virtual code generation device 100 is a server of a seller that supplies electricity, gas, water, data, etc., the virtual code generation device 100 receives a purchase request for usage rights of electricity, gas, water, and data from a user and generates a virtual code.

In an embodiment, the virtual code generation device 100 generates a virtual code after receiving a purchase request for a unique value of the virtual code verification device 100 and a usage amount of electricity, gas, and water from a user.

At this time, the detail code generation unit 110 searches for a UID matching the usage amount input when a purchase request is made among a plurality of UIDs corresponding to the unique value of the virtual code verification apparatus 100.

A plurality of UIDs are matched and stored for each unique value of the virtual code verification device 100 in the UID storage unit 140, and control command information is matched and stored in at least some of the plurality of UIDs. Each of the control command information matched to the UID defines a different usage amount or charging amount. The detail code generation unit 110 searches for the UID stored by matching the control command information corresponding to the usage amount or charging amount requested by the user in the UID storage unit 140, and generates a detailed code using the searched UID.

The virtual code generation function includes one or more detail code generation functions. For example, the virtual code generation function generates a plurality of detail codes by using a plurality of detail code generation functions, and generates a virtual code by using a detail code combination function that combines the plurality of detail codes.

In one embodiment, the virtual code generation device 100 generates a detail code that can reach the storage location of the UID found in the above-described manner.

As a specific example, the number of UIDs stored in the virtual code generation device 100 may be the same as the number of unit counts included from the start time point to the end time point of a specific period. For example, if the length of a specific period is one week and the unit count is '1 minute', the number of UIDs stored in the virtual code generation device 100 may be 10080 minutes (168 hours).

A plurality of UIDs are matched for each count. For example, if the length of a specific period is one week and the unit count is '1 minute', 10080 UIDs are matched for each minute. The virtual code generation device 100 may search for a UID matched to a specific time point.

The detail code generation function may generate a detail code using a UID (hereinafter, purchase time point UID) matched to a count corresponding to a time point at which a user's virtual code generation request (or purchase request) is received, and generate a detail code by using a search path to a UID (hereinafter, referred to as a control command UID) in which control command information corresponding to a user's purchase request is matched and stored based on the purchase time point UID.

In an embodiment, the detail code generation unit 110 may generate the first code and the second code by including the first function and the second function as the detail code generation function. At this time, the virtual code generation device 100 only includes a first function for generating a first code and a second function for generating a second code as a detail code generation function to increase security, and may not include data on the correlation between the first code and the second code.

The virtual code generation unit 120 generates a virtual code by combining one or more detail codes using a virtual code generation function. In one embodiment, the virtual code is generated by combining a plurality of detail codes according to a specific rule. The virtual code generation function includes a rule for combining a plurality of detail codes (i.e., a detail code combination function). That is, the virtual code generation unit 120 may combine one or more detail codes using a detail code combination function included in the virtual code generation function.

Various methods may be applied as a method of generating one virtual code by combining a plurality of detail codes. As an example of the detail code combination function, the virtual code generation unit 120 may generate a virtual code by alternately arranging an N-digit first code and an N-digit second code. Also, as another example, the detail code combination function may be a function combining the second code after the first code. As the number of detail codes included in the virtual code increases, the detail code combination function can also be generated in various ways.

In addition, as an embodiment, when the virtual code is generated by a combination according to a specific rule of the first code and the second code, the first code and the second code may perform respective roles for searching the storage location of the control command UID in the storage location search algorithm in which the user information is stored. For example, the first code sets the starting point of the storage location search using the purchase time point UID, and the second code sets a search path from the starting point to the storage location of the control command UID according to a specific search method. That is, when the virtual code generated normally in the virtual code generation device 100 is provided for each unit count, the virtual code verification device 100 determines that the point moved along the search path corresponding to the second code from the search starting point corresponding to the first code is the point at which the user information is stored (i.e., control command UID storage location). A specific method of searching the storage location of the UID based on the first code and the second code constituting the virtual code will be described later.

In an embodiment of the method in which the detail code generation unit 110 generates a detail code, the detail code generation unit 110 generates a new detail code for each unit count, and accordingly, the virtual code generation device 100 generates a new virtual code for each unit count. Virtual codes newly generated for each unit count within a specific period are not duplicated. Specifically, the detail code generation unit 110 may prevent the newly generated virtual code for each unit count from being duplicated for a period determined for a specific user or a specific virtual code generation device 100. For example, if a specific period is one week, the same virtual code is not duplicated during one week.

As a specific embodiment to prevent duplicate virtual code, when generating the N-digit first code or second code with M characters, the detail code generation function included in the virtual code generation function may generate $M^N$ codes as the first code or the second code, and match each code for each count from the initial time point at which the detail code generation function is run. For example, when the unit count is set to 1 minute, different $M^N$ codes are matched every second from the time point at which the detail code generation function is driven. In addition, if the period using a specific detail code generation function or the usage period (e.g., the validity period of the user terminal where the application that generates the virtual code is installed) of the virtual code generation device 100 is set to a time length shorter than the time length corresponding to the $M^N$ count (e.g., $M^N$ seconds if 1 count is 1 second), the first code or the second code is not duplicated during the usage period. That is, as the count increases over time, when the user makes a virtual code generation request to the virtual code generation device 100 at a specific time point, the virtual code generation device 100 may generate a code value matched with a count corresponding to a specific time point as a first code or a second code.

Here, the initial time point at which the detail code generation function is driven may vary for each preset period. The detail code generation unit 110 updates the driving time point of the detail code generation function with a preset period, and prevents duplicate generation of the same code until the update time point of the next detail code generation function. For example, if the detail code generation function sets the unit count to 1 minute and the usage period to one week, 10080 different detail codes can be generated for a week (10080 minutes).

Specifically, if uppercase letters of the alphabet and numbers 0 to 9 are used as characters that can be included in the code (that is, 36 characters are used), and 6 digits are allocated to the first code and the second code, respectively, the virtual code generation device 100 may provide 36⁶ codes as the first code and the second code. In this case, the virtual code generation device 100 may provide a first code and a second code changed for each count by matching each code for each count.

As another specific embodiment to prevent duplicate creation of virtual codes, when the usage period of the virtual code generation device 100 has elapsed, by changing the function that generates the first code or the second code (i.e., the first function or the second function), or by changing the matching relationship between the first code and the second code, a virtual code different from the previous usage period is generated. In a case where the virtual code is combined with the first code generated by the first function and the second code generated by the second function, when the first code generation function or the second code generation function is changed, as the order in which the first code or the second code appears is different from the previous usage period, the virtual code generation device 100 may apply a virtual code generation function that generates a virtual code different from the previous period to the new usage period. In addition, the virtual code generation device 100 may select a first function and a second function in order to prevent the same code as the virtual code used in the previous usage period from appearing as a virtual code for each count in the new usage period (i.e., so that the matching relationship between the first code generated according to the first function and the second code generated according to the second function is not included in the matching relationship included in the previous usage period in all counts of the new usage period). That is, after the usage period that $M^N$ codes can be applied once has elapsed, by adjusting or updating the virtual code generation function, the virtual code generation function of the new usage period that does not generate a virtual code overlapping with the previous usage period can be applied.

In addition, as another specific embodiment to prevent duplicate creation of virtual codes, in order to prevent duplicate virtual codes from occurring regardless of the user in the entire period, the first code is set as a code value corresponding to the time point (or count) at which the virtual code generation request is made among the codes matched for each count from the initial time point (a specific period start time point) at which the first function is driven, and the second code may be set as a code value designating a search path to the control command UID, and a virtual code may be used as a code value in which the first code and the second code are combined. In this case, the detail code generation function generates only one virtual code for each unit count. For this reason, the first code becomes a different code value for each count, so that the virtual code in which the first code and the second code are combined outputs different code values at all time points during a specific period.

In this case, if one user makes multiple virtual code generation requests (purchase requests) at the same time, the virtual code generation device generates one virtual code using the UID corresponding to the time point (or count) at which the virtual code generation request is made, and generates another virtual code by using the UID corresponding to the next count of the count for which the virtual code generation request is made.

As a specific example, when a user makes three purchase requests at the same time, the virtual code generation device forms a virtual code using a first code that uses a UID corresponding to a purchase request time point count (first count) as a start time point, and a second code that sets a search path to a control command UID corresponding to the first purchase request, forms a virtual code using a first code that has a UID corresponding to the next count (second count) as a start time point of the first count, and a second code that sets a search path to a control command UID corresponding to a second purchase request, and forms a virtual code using the first code that uses the UID corresponding to the next count (third count) as the start time point of the second count, and the second code that sets the search path to the control command UID corresponding to the third purchase request.

Through this, the present invention prevents duplicate codes from being generated even when a user makes a plurality of virtual code generation requests at the same time.

In addition, in another embodiment, any one of a plurality of enumeration rules for arranging M characters in an ascending order is applied to the virtual code generation function (or detail code generation function). That is, the virtual code generation device 100 may apply various rules for listing M characters in ascending order to the detail code generation function included in the virtual code generation function. For example, the listing rule for arranging uppercase letters of the alphabet in ascending order may be A, B, C, . . . , Z, which is a general order, or A, C, B, . . . , Z. As the listing rules are changed in the virtual code generation function, the order of matching codes to each count is changed from the initial time point at which the virtual code generation function is operated.

Also, in another embodiment, by changing the detail code combination function every preset period, the virtual code generation device 100 may enable the detail code generated in the detail code generation function to be combined in a different way every period.

On the other hand, when the virtual code according to the present invention is utilized in an existing token system, the virtual code may be generated in the form of an existing token. For example, the virtual code may include at least one of token class information, token subclass information, a unique value of the virtual code verification device 200, period information, and the first and second codes.

Meanwhile, the virtual code may not include the unique value of the virtual code verification device 200, and the unique value of the virtual code verification device 200 may be used to encrypt and decrypt the virtual code.

In an embodiment, a separate code for encryption and decryption may be further included. The virtual code may further include a Cyclic Redundancy Check (CRC) code. The virtual code generation device 100 divides the code combining the token class information, token subclass information, period information, and the first and second codes by a preset value and adds the remaining value (CRC code) to generate a virtual code. When the virtual code verification device 200 divides the virtual code by the same value as the preset value stored in the virtual code generation device 100, if the remainder is 0, it may be determined as a normal code.

Here, the preset value may be a unique value of the virtual code verification device 200. In this case, the virtual code does not include the unique value of the virtual code verification device 200, but the virtual code generated exclusively for the specific virtual code verification device 200 is determined as a normal code only within the specific virtual code verification device 200.

In addition to the above-described embodiment, the unique value of the virtual code verification device 200 may be utilized to encrypt and decrypt the virtual code in various ways.

The period information is a period value set in the virtual code generation device 100 at the virtual code generation time point. The virtual code generation device 100 updates period information stored in the virtual code generation device 100 for every preset period. For example, if the preset period is one week, the virtual code generation device 100 updates period information every week. Here, the time point as a reference of the period information may be the first time point at which the driving of the virtual code generation device 100 is started, or a time point at which the virtual code verification device 200 is registered with the virtual code generation device 100. The period information continuously increases based on the reference time point.

The virtual code is generated not to be duplicated within a specific period. Virtual codes generated in different periods may be identical to each other, but the virtual code verification device 200 may verify the validity of the virtual code using the period information. This will be described later.

The unique value of the virtual code verification device 200 is a value stored in both the virtual code generation device 100 and the virtual code verification device 200, and the virtual code verification device 200 to be described later extracts a unique value of the virtual code verification device 200 from the virtual code, and primarily verifies the virtual code using the extracted unique value.

However, as described above, the virtual code does not necessarily include the unique value of the virtual code verification device 200. By utilizing the unique value of the virtual code verification device 200 for encryption and decryption of the virtual code, a code generated exclusively for a specific virtual code verification device 200 may be determined as a normal code only in a specific virtual code verification device 200.

The virtual code generation device 100 may generate a virtual code in the form of an existing token. Through this, the present invention can provide a control method with improved complementation while utilizing the existing token system as it is.

The virtual code provision unit 130 transmits the generated virtual code to the virtual code reception means 20 or the virtual code verification means 30.

Figure 6:
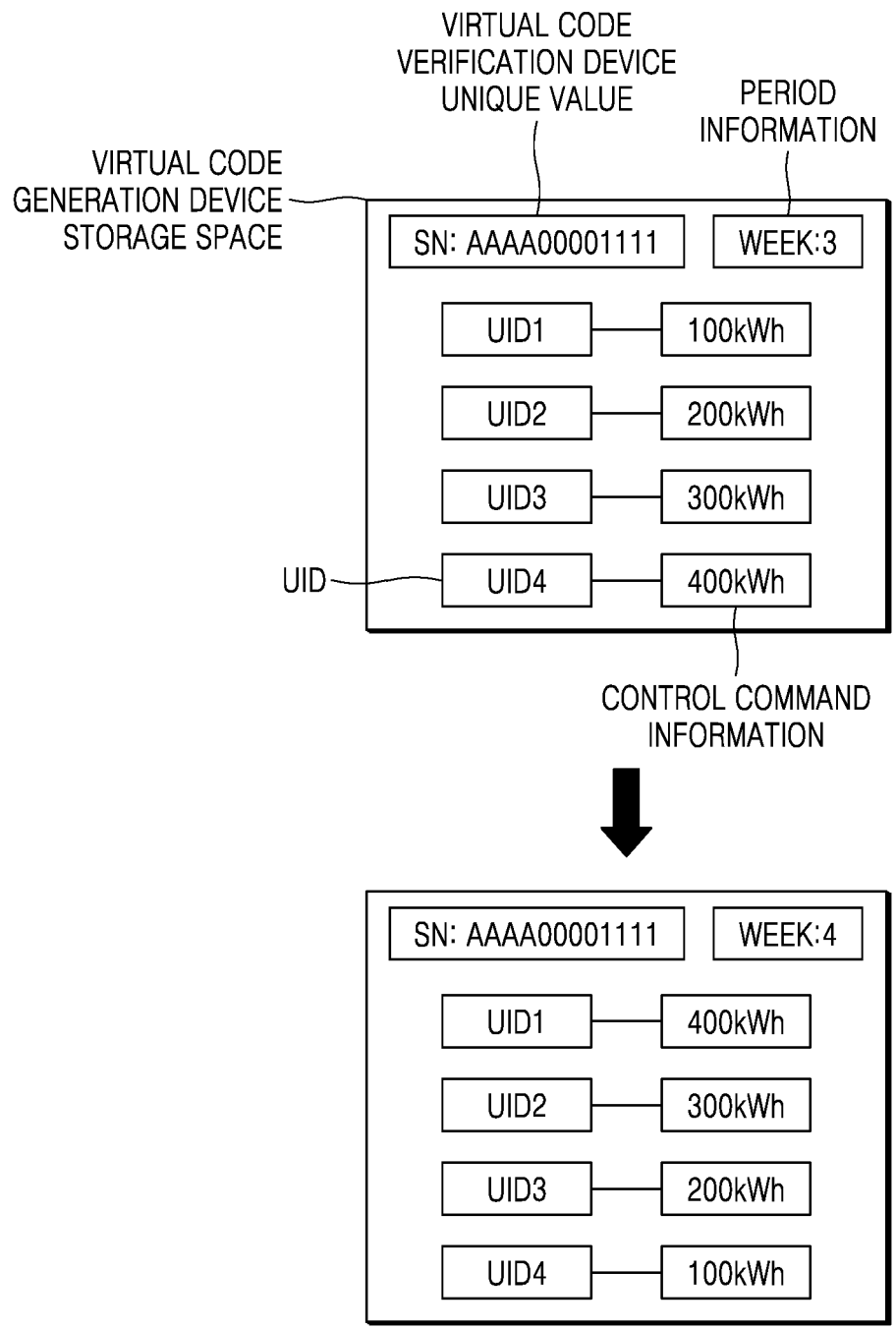
FIG. 6 is an exemplary diagram for explaining a storage space of a virtual code generation device according to an embodiment of the present invention.

Referring to FIG. 6, the UID storage unit 140 matches and stores a plurality of UIDs to a unique value of the virtual code verification device 200, and different control command information is matched to each of the plurality of UIDs and stored. The UID storage unit 140 changes the matching relationship between the UID and the control command information for each preset period. Although UIDs to which the control command information does not match are not illustrated in FIG. 6, some of the plurality of UIDs may not be stored because the control command information is matched.

Figure 3:
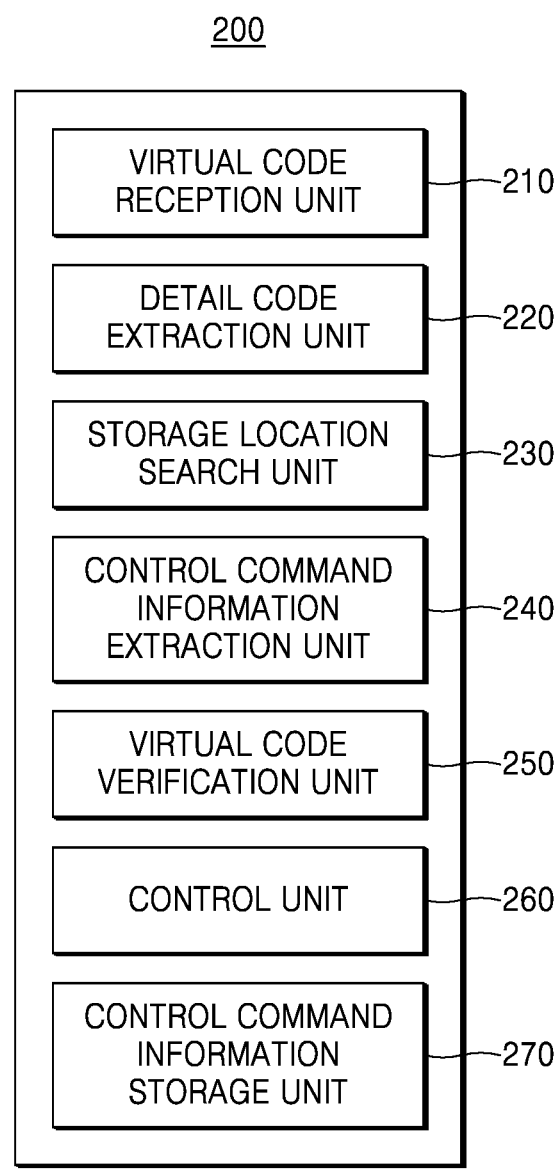
FIG. 3 is a block diagram of a virtual code verification device according to an embodiment of the present invention.

FIG. 3 is a block diagram of a virtual code verification device according to an embodiment of the present invention.

The virtual code verification device 200 may be an electricity meter, a gas meter, and a water meter. However, the present invention is not limited thereto, and the virtual code verification device 200 may be any terminal capable of granting usage rights to the user.

As shown in FIG. 3, the virtual code verification device 200 includes a virtual code reception unit 210, a detail code extraction unit 220, a storage location search unit 230, a control command information extraction unit 240, and a virtual It includes a code verification unit 250, a control unit 260, and a control command storage unit 270.

Here, the virtual code verification device 200 extracts a UID (control command UID) based on the virtual code, determines whether the received virtual code is a normal code based on the virtual code, and performs a control command.

The virtual code reception unit 210 receives the virtual code. The virtual code reception unit 210 may include a communication module or an input module through which a user can directly input a virtual code.

The detail code extraction unit 220 extracts one or more detail codes included in the virtual code.

In an embodiment, the detail code extraction unit 220 may extract a unique value of the virtual code verification device 200, period information, and first and second codes from the virtual code.

In another embodiment, the detail code extraction unit 220 may decrypt the virtual code using the unique value of the virtual code verification device 200 stored in the virtual code verification device, and then extract period information, first and second codes from the decoded code. In this case, the virtual code generation device 100 and the virtual code verification device 200 must include the same encryption algorithm.

In an embodiment, the detail code extraction unit 220 includes a detail code combination function included in the virtual code generation function. Accordingly, when the virtual code includes a plurality of detail codes, the detail code extraction unit 220 may extract a plurality of detail codes from the virtual code by applying a detail code combination function. For example, when generating a virtual code in which three detail codes (period information, first code and second code) are combined in the virtual code generation device 100, the detail code extraction unit 220 may separate period information, the first code, and the second code by applying a detail code combination function from the character array of the virtual code.

As an embodiment, the detail code combination function may be changed every preset period. In this case, the detail code combination function included in each of the virtual code generation device 100 and the virtual code verification device 200 should be the same. For this, the detail code combination function included in each of the virtual code generation device 100 and the virtual code verification device 200 is changed according to the same rule in the same period.

The storage location search unit 230 searches the storage location of the UID (control command UID) in the storage location search algorithm based on one or more extracted detail codes. Here, the storage location search algorithm is matched to the virtual code generation function used when generating the virtual code in the virtual code generation device 100. Various methods may be applied as a method of searching for the storage location of the UID based on each detail code in the storage location search unit 230. In order for the storage location search unit 230 to search for a storage location based on a plurality of detail codes, a correlation may be included between the detail codes.

When the virtual code includes the first code and the second code, as an embodiment having a correlation between detail codes, the storage location search unit 230 may determine a search starting point (purchase time point UID) corresponding to the first code, and find a point moved along the search path corresponding to the second code from the search starting point as the storage location of the UID (control command UID). That is, the detail code may include a first code that sets the starting point of the storage location search and a second code for setting a search path from the starting point (purchase time point UID) to the storage location of the UID (control command UID) according to a specific search method.

Also, in another embodiment, in order to find the storage location of the UID using a plurality of detail codes with correlation, the storage location search unit 230 may include a storage location search algorithm. The storage location search algorithm is an algorithm that enables storage location search when each detail code included in the virtual code is applied, and is to match the virtual code generation function used when generating the virtual code in the virtual code generation device 100.

For example, when the virtual code includes a first code for determining a search starting point of a storage location and a second code for indicating a storage location direction from the search starting point, the storage location search algorithm is an algorithm that adjusts the storage location matching the registration time point of the UID (control command UID) to the corresponding location when the direction corresponding to the second code is indicated at the point corresponding to the first code.

The control command information extraction unit 240 extracts the control command information stored by matching the storage location of the UID (control command UID) searched for by the storage location search unit 230. That is, the virtual code verification device 200 may extract control command information stored by matching the storage location of each UID in the storage location search algorithm. The control unit 360 performs control corresponding to the extracted control command information.

As the storage location search algorithm is used, the virtual code verification device 200 may search for the UID storage location even if the first code and the second code included in the virtual code are changed. The storage location search algorithm can be applied in various ways, and specific examples will be described later. However, the storage location search algorithm is not limited to the example described later.

Figure 5:
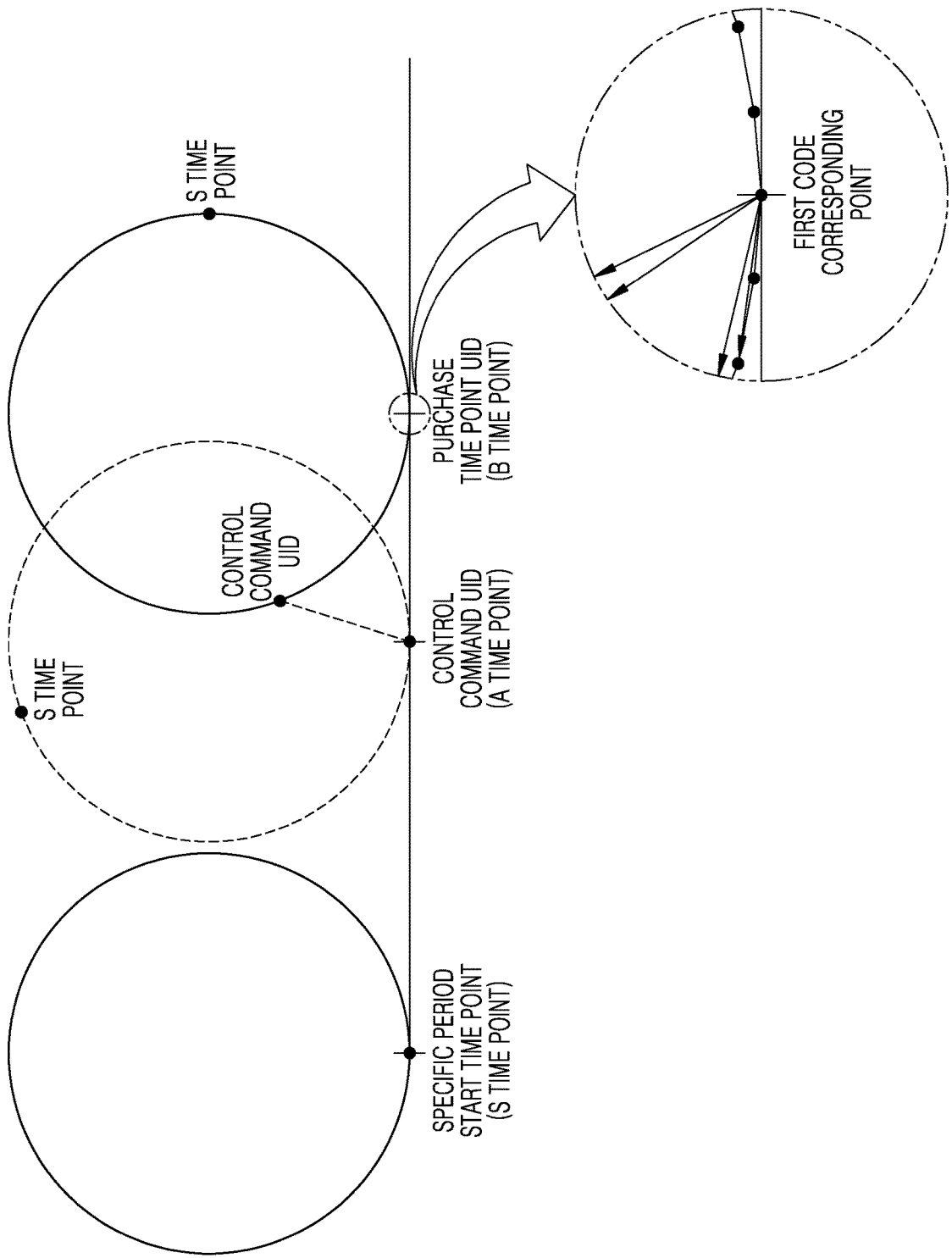
FIG. 5 is an exemplary diagram of a storage location search algorithm for searching a storage location of a UID through roll and movement of a k-gon according to an embodiment of the present invention.

For example, referring to FIG. 5, when the storage location search algorithm is a k-gon (k is $M^N$) that rolls and moves along the track in which $M^N$ codes corresponding to the first code are listed and the vertex of the k-gon moves while corresponding to the point where the code is placed on the first code track, each vertex of the k-gon matches the storage location of the UID, and a point at which the first code track (i.e., the first track) and the k-gon correspond may be a storage location search starting point corresponding to the first code. In this case, the storage location search unit 230 may apply a roll movement to the k-gon so that the vertex of the k-gon is in contact with the point corresponding to the first code extracted by the detail code extraction unit 220. Through this, as indicated by the angle (e.g., a specific angle that divides 180 degrees into $M^N$ to face the vertex of the k-gon) corresponding to the second code at the location on the first track that k-gon is in contact, the storage location search unit 230 may search for the vertex of k-gon, which is a storage location where a UID (control command UID) corresponding to the virtual code is stored.

Specifically, as in FIG. 5, the virtual code verification device 200 rolls and moves the k-gon as a point corresponding to the first code (i.e., move so that each vertex of the k-gon and each point on the track are in contact with each other in turn). Thereafter, the virtual code verification device 200 searches for a vertex corresponding to the storage location by indicating the angular direction corresponding to the second code.

After the storage location of the UID is searched by the storage location search unit 230 using the first code and the second code in the virtual code in the storage location search algorithm, the control command information extraction unit 240 extracts the stored control command information matched to the corresponding location.

A detailed description of the other various storage location search algorithms will be described later.

The virtual code verification unit 250 verifies the virtual code using the unique value and period information of the virtual code verification device 200 extracted from the virtual code.

In one embodiment, the virtual code verification unit 250 primarily verifies the virtual code by comparing the unique value of the virtual code verification device 200 extracted from the virtual code and the unique value stored in the virtual code verification device 200. If the two unique values do not match, the virtual code verification unit 250 determines that the received virtual code is invalid.

In another embodiment, the virtual code generation device 100 and the virtual code verification device 200 include the same encryption algorithm, the virtual code generation device 100 encrypts the virtual code using the virtual code verification device 200 unique value, and the virtual code verification device 200 decrypts the virtual code using a unique value stored in the device. If there is no unique value of the virtual code verification device 200, because the virtual code cannot be decrypted, the virtual code cannot be used.

The virtual code verification device 200 updates period information stored in the virtual code verification device 200 for every preset period. The period information stored in each of the virtual code generation device 100 and the virtual code verification device 200 is updated to the same value at the same time point.

The virtual code verification unit 250 may determine a time point at which a specific period starts based on period information extracted from the virtual code or period information stored in the virtual code verification device 200.

In a specific embodiment, the virtual code generation device 100 generates the virtual security code by reflecting the first code and the second code without outputting the virtual security code to the outside. The virtual code generation means generates a first code based on a UID (purchase time point UID) corresponding to a virtual code generation request (purchase request) time point (or count), and generates a second code including a search path to a UID (control command UID) stored by matching a control command corresponding to a purchase request based on the purchase time point UID.

On the other hand, when the period information extracted from the virtual code and the period information stored in the virtual code verification device 200 do not match, the virtual code verification unit 250 checks whether the period corresponding to the period information extracted from the virtual code is a period immediately preceding the period corresponding to the period information stored in the virtual code verification device 200. For example, when the period information stored in the virtual code verification device 200 is 'week 4', the virtual code verification unit 250 checks whether the period information extracted from the virtual code is 'week 3'.

If the period information extracted from the virtual code and the period information stored in the virtual code verification device 200 do not match, and the period corresponding to the period information extracted from the virtual code is not the period immediately preceding the period corresponding to the period information stored in the virtual code verification device 200, the virtual code verification unit 250 determines that the received code is an invalid code.

Moreover, if the period information extracted from the virtual code and the period information stored in the virtual code verification device 200 do not match, and the period corresponding to the period information extracted from the virtual code is the period immediately preceding the period corresponding to the period information stored in the virtual code verification device 200, the virtual code verification unit 250 determines a specific period start time point based on the period information extracted from the virtual code, and generates a virtual security code from the specific period start time point to the specific period end time point. Thereafter, it is determined whether there is a code matching the virtual security code included in the first code and the second code among the generated virtual security codes.

The virtual code verification unit 250 determines the generation time point of the virtual code using the first code and period information extracted from the virtual code. When the difference between the virtual code generation time point and the virtual code reception time point exceeds the preset validity period of the virtual code, the virtual code verification unit 250 determines that the virtual code is not valid. On the other hand, when the difference between the virtual code generation time point and the virtual code reception time point is within the validity period of the preset virtual code, it is determined that the virtual code is a valid code and it enables control command information to be extracted based on the period information extracted from the virtual code.

More specifically, the virtual code verification device 200 stores a plurality of UIDs in the same format as the virtual code generation device 100, and each of the plurality of UIDs is matched to each of a plurality of counts included from a specific period start time point to a specific period end time point. The matching relationship between the UID and the count is the same in each of the virtual code generation device 100 and the virtual code verification device 200. Accordingly, the virtual code verification device 200 may specify a purchase request time point within a specific period using the purchase time point UID included in the first code. However, only the purchase time point UID can specify only the purchase request time point based on the specific period start time point, and cannot specify the absolute purchase request time point.

The virtual code verification device 200 may specify a period in which a purchase request is made using period information. The virtual code verification device 200 may specify the absolute purchase request time point based on the purchase request time point based on the period in which the purchase request is made and the specific period start time point.

The virtual code verification device 200 may determine the validity of the virtual code based on the absolute purchase request time point and the virtual code reception time point specified based on the period information and the first code.

In one embodiment, when it is determined that the virtual code is valid in the state that the period information extracted from the virtual code and the period information stored in the virtual code verification device 200 do not match, the control command information extraction unit 240 extracts control command information from the UID according to the matching relationship between the UID and the control command information before the period information is updated in the virtual code verification device 200.

More specifically, a plurality of UIDs are stored in the virtual code verification device 200, and control command information is matched and stored in some of the plurality of UIDs. The matching relationship between the UID and control command information is changed every time period information is updated in the virtual code verification device 200. At this time, because the matching relationship change rule between the UID and control command information is the same as the rule applied to the virtual code generation device 100, the matching relationship of each of the virtual code generation device 100 and the virtual code verification device 200 at the same time point is the same.

When the user receives a virtual code from the virtual code generation device 100 within a specific period and then inputs the virtual code to the virtual code verification device 200 within a specific period, because the UID and control command information matching relationship in the virtual code generation device 100 and the virtual code verification device 200 are the same, control command information that is the basis when generating a virtual code in the virtual code generation device 100 may be extracted from the virtual code verification device 200.

When the user receives a virtual code from the virtual code generation device 100 within a specific period and then inputs the virtual code to the virtual code verification device 200 within a specific period, because the UID and control command information matching relationship in the virtual code generation device 100 and the virtual code verification device 200 are the same, control command information that is the basis when generating a virtual code in the virtual code generation device 100 may be extracted from the virtual code verification device 200. When a user is issued a virtual code near a specific period end time point, the validity period of the virtual code may remain even after the specific period ends. The present invention allows the virtual code to be verified and utilized as a valid code in the virtual code verification device 200 even in this case. For this end, as described above, even when the period information extracted from the virtual code and the period information stored in the virtual code verification device 200 do not match, the present invention allows the virtual code to be determined as a valid code by additionally verifying the virtual code.

Figure 7:
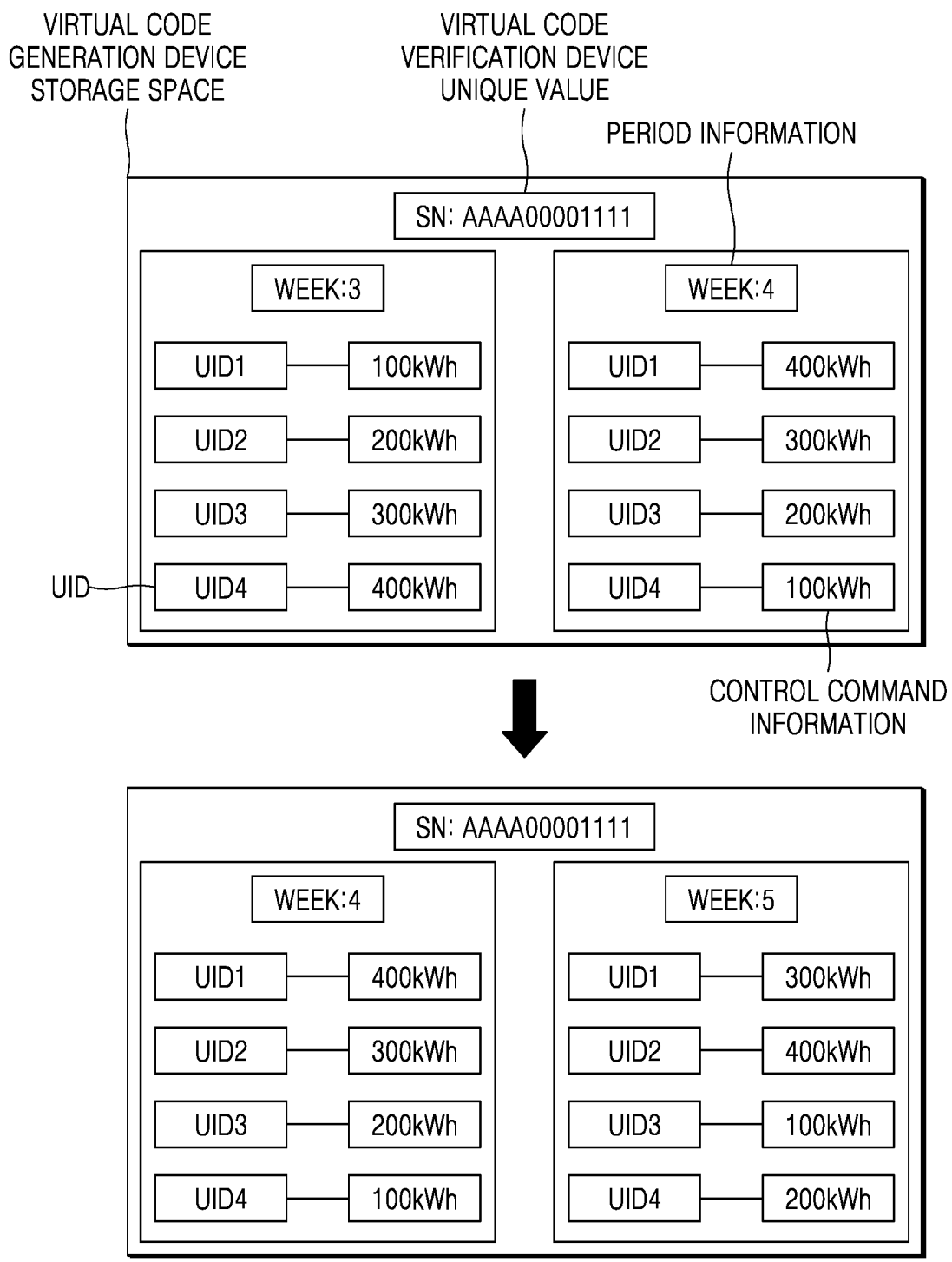
FIG. 7 is an exemplary diagram for explaining a storage space of a virtual code verification device according to an embodiment of the present invention.

In addition, in order for the virtual code to be utilized even in the above case, even if a certain period ends and the matching relationship between the UID and control command information is changed, the control command information storage unit 370 stores the matching relation (see FIG. 7) without deleting the matching relation of the immediately preceding period. That is, the virtual code verification device 200 stores both the UID and control command information matching relationship corresponding to the current period and the UID and control command information matching relationship corresponding to the immediately preceding period.

When it is determined that the virtual code is valid in the state that the period information extracted from the virtual code and the period information stored in the virtual code verification device 200 do not match, the control command information extraction unit 240 extracts control command information by using the UID corresponding to the end time point and the control command information matching relationship.

When the virtual code verification is completed by the virtual code verification unit 250, the control unit 260 performs control corresponding to the control command information extracted by the control command extraction unit 240.

In one embodiment, when the virtual code verification device 200 is a meter of electricity, gas, water, etc., the virtual code verification device 200 allows the user to use electricity, gas, water, etc. as much as a usage amount corresponding to the extracted control command information.

Figure 4:
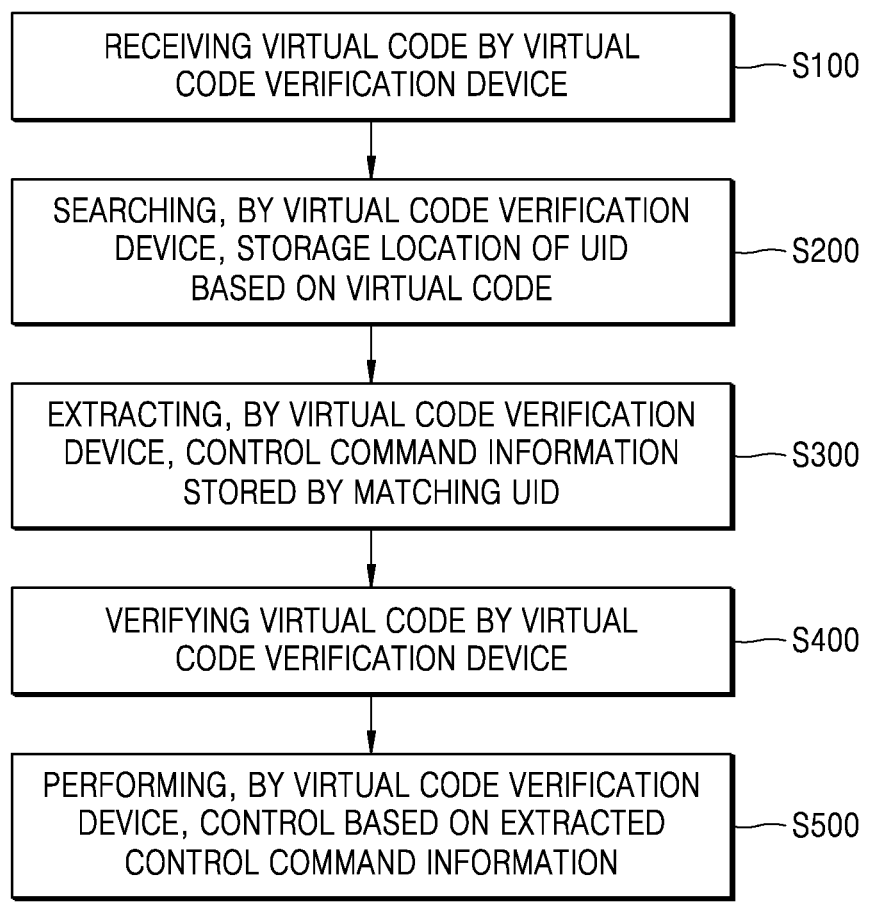
FIG. 4 is a flowchart of a transaction method using a virtual code according to an embodiment of the present invention.

FIG. 4 is a flowchart of a control method using a virtual code according to an embodiment of the present invention.

Referring to FIG. 4, the control method using a virtual code according to an embodiment of the present invention includes receiving a virtual code by a virtual code verification device S100 (virtual code reception step), searching for a UID based on the virtual code by the virtual code verification device S200 (UID search step); extracting the stored control command information matched to the UID storage location searched by the virtual code verification device S300, verifying the virtual code by the virtual code verification device S400, and performing control based on the control command information by a virtual code verification device S500. Hereinafter, a detailed description of each step is described. However, the detailed disclosure of the above-described content in the process of describing the virtual code generation device 100 (i.e., seller server) and the virtual code verification device 200 (virtual code verification means 20) will be omitted.

In step S100, the virtual code verification device 200 receives the virtual code. Here, the virtual code is generated by the virtual code generation function included in the virtual code generation program based on the UID.

According to an embodiment, the virtual code may be generated based on the UID included in the virtual code generation device 100.

The virtual code generation device 100 generates a virtual code based on the UID using a virtual code generation function, and provides the generated virtual code to the virtual code verification window 200.

In one embodiment, after searching for a UID corresponding to a user's purchase request among a plurality of pre-stored UIDs, the virtual code generation device 100 may generate each detail code by using the searched UID as seed data of the detail code generation function.

When a plurality of detail codes are generated using each detail code generation function, the virtual code generation device 100 may generate a virtual code in which a plurality of detail codes are combined using a detail code combination function included in the virtual code generation function. For example, the virtual code generation device 100 uses the dedicated program 11 to generate a virtual code by using the UID as seed data.

In addition, the virtual code may be generated in various ways. That is, the virtual code may be generated by various virtual code generation functions. Since the detailed description of generating the virtual code in various ways is substantially the same as the description given above with reference to FIG. 5, a detailed description thereof will be omitted.

Then, in step S200, the virtual code verification device 200 searches the storage location of the UID in the storage location search algorithm based on the virtual code. Here, the storage location search algorithm is matched to the virtual code generation function included in the virtual code generation device 100 (i.e., the seller server), and enables to search the storage location of UID based on at least one detail code in the virtual code.

In an embodiment, control command information may be matched and stored in each UID. The matching relationship between the plurality of UIDs and the control command information is changed every preset period.

According to an embodiment, when the virtual code includes the first code and the second code, the virtual code verification device 200 searches the UID storage location in the storage location search algorithm using the first code and the second code. For example, the first code may be a code that sets the starting point of the storage location search of the UID in the storage location search algorithm, and the second code may be a code for setting a search path from a starting point to a UID storage location according to a specific search method.

As shown in FIG. 5, the virtual code verification device 200 sets the location corresponding to the first code as a starting point, and searches for a point (i.e., a specific vertex of the k-gon) that matches the UID storage location in the arrangement state of the k-gon based on the second code according to the search method applied to the second code. A storage location is matched to each vertex of the k-gon. A point where the first code track (i.e., the first track) and the k-gon correspond becomes a storage location search starting point corresponding to the first code. The virtual code verification device 200 searches for the matching point of the UID storage location based on the second code from the search starting point.

Various methods may be applied as a method of searching the storage location in the k-gon based on the second code. As an example, as indicated by the angle (e.g., a specific angle that divides 180 degrees into $M^N$ to face the vertex of the k-gon) corresponding to the second code at the location on the first track that k-gon is in contact, the virtual code verification device 200 may search the vertex of k-gon, which is the storage location where the UID is stored, based on the virtual code.

In addition, as another example, in a state where k-gon is in contact with a point corresponding to the first code on the first track, the virtual code verification device 200 divides the entire central angle (i.e., 360 degrees) into $M^N$ based on the center of the k-gon and the contact point on the first track, and matches each angle to the $M^N$ second codes. At this time, the direction of the line moving a specific number of unit angles (i.e., 360 degrees/$M^N$) from the line connecting the center of the k-gon and the contact point on the first track becomes a specific vertex of the k-gon. Accordingly, when the second code corresponding to a specific angle is received, the virtual code verification device 200 may search for a vertex located in the corresponding angle direction.

Also, as another example, a specific digit of the second code may be used to determine the angle calculation direction. That is, when the second code is generated using N characters (N is a natural number), the angle measurement direction can be determined with one digit. For example, when matching the second code to each angle by dividing the entire central angle (i.e., 360 degrees) based on the center of the k-gon and the contact point on the first track, the virtual code verification device 200 may determine, with a value of one digit, whether the angle is measured in the left direction or the angle is measured in the right direction from the line connecting the center of the k-gon and the contact point on the first track.

For example, in the storage location search algorithm, two different second codes may be assigned to one vertex according to the angle measurement direction at each vertex on the k-gon. That is, when reaching one vertex by an inner angle and by an outer angle, this is matched with another second code, and the storage location of a different UID can be connected. As another example, in the case of generating the second code using N (N is a natural number), the storage location search algorithm may match half of the total angle (e.g., 360 degrees when dividing based on the central angle) with N-1 pieces, and use one digit to determine the angle application direction to reach each vertex.

The method of searching the storage location in the k-gon based on the second code is not limited thereto, and various methods such as a method of searching as a storage location a point dividing a space between a point on the k-gon corresponding to the second code and a contact point on the first track by a specific ratio may be applied.

Then, in step S300, the virtual code verification device 200 extracts the stored control command information matched to the found UID storage location.

Specifically, the virtual code verification device 200 extracts the stored control command information by matching the storage location of the searched UID. That is, because the virtual code verification device 200 stores control command information in each UID storage location in the storage location search algorithm, the virtual code verification device 200 may extract control command information stored by matching the storage location of a specific UID within the storage location search algorithm.

Thereafter, in step S400, the virtual code verification device 200 verifies the virtual code based on the time point at which the virtual code is received. However, step S400 is not necessarily performed after step S300, and may be performed after extracting the virtual code verification device 200 unique value, period information, and first and second codes from the virtual code.

In step S500, when it is determined that the virtual code is a normal code, the virtual code verification device 200 performs control based on the stored control command information matched to the UID storage location.

Hereinafter, when the virtual code verification device is an electricity meter, an embodiment of charging the amount of power using a virtual code will be described in detail.

A user purchases a certain amount of electricity usage rights from a virtual code generation device and is issued a virtual code. The electricity meter may receive the virtual code in the various ways described above.

The electricity meter decrypts the encrypted virtual code using the meter unique value stored in the meter. At this time, the algorithm used when the virtual code generation device encrypts the virtual code and the algorithm that the meter decrypts the virtual code are the same.

In an embodiment, the virtual code may include the above-mentioned CRC code for encryption and decryption of the virtual code.

Because the virtual code cannot be decrypted without the unique value of the meter, the code generated exclusively for a specific meter can only be decrypted by the specific meter.

If it is confirmed that the received virtual code is a code generated exclusively for the meter through the virtual code decryption process, the meter searches for the control command UID. In this case, the above-described search methods may be used.

In addition, the meter calculates the absolute time point at which the virtual code is generated using the period information and the first code extracted from the virtual code, and determines whether the received virtual code is a received virtual code within the validity period using the calculated virtual code generation time point and virtual code reception time point.

It is determined that the received virtual code is a virtual code received within the validity period, and the meter matches the control command UID and applies the power charge amount according to the stored control command information. After that, the meter is driven based on the amount of charged power.

On the other hand, if the received virtual code is received after a certain period end time point but is received within the validity period, the meter extracts the control command information by utilizing the matching relationship between the UID corresponding to the end time point and the control command information, and applies the power charge amount according to the extracted control command information.

Through this, the present invention allows the amount of electricity to be charged using the virtual code even if the virtual code with the remaining validity period is input to the meter after the period change time point of the meter.

The transaction method using a virtual code according to an embodiment of the present invention described above may be implemented as a program (or application) to be executed in combination with a computer, which is hardware, and stored in a medium.

In order for the computer to read the program and execute the methods implemented as a program, the above-described program may include code coded in a computer language such as C, C++, JAVA, Ruby, or machine language that can be read by a processor (CPU) of the computer through a device interface of the computer. Such code may include functional code related to a function defining functions necessary to execute the above methods, and the like, and may include an execution procedure related control code necessary for the processor of the computer to execute the functions according to a predetermined procedure. In addition, such code may further include additional information necessary for the processor of the computer to execute the functions or code related to memory reference for which location (address number) in the internal or external memory of the computer to be referenced. In addition, when the processor of the computer needs to communicate with any other computer or server in a remote location in order to execute the functions, the code may further include communication-related code for how to communicate with any other remote computer or server using the communication module of the computer, and what information or media to transmit/receive during communication.

The storage medium is not a medium that stores data for a short moment, such as a register, a cache, a memory, etc., but a medium that stores data semi-permanently and can be read by a device. Specifically, examples of the storage medium include, but are not limited to, ROM, RAM, a CD-ROM, magnetic tape, a floppy disk, and an optical data storage device. That is, the program may be stored in various recording media on various servers accessible by the computer or in various recording media on the computer of the user. In addition, the medium may be distributed in a computer system connected by a network, and computer-readable code may be stored in a distributed manner.

According to the present invention as described above, it has various effects as follows.

First, by limiting the time during which the virtual code can be used, even if the virtual code is leaked, the possibility that others will use it can be lowered.

Second, because the virtual code generation rule is periodically changed, even if a part of the virtual code generation rule is leaked, the virtual code cannot be forged.

Third, as a virtual code is newly generated for each unit count and the duplicated virtual code does not appear within a predetermined period, or a virtual code verification device randomly generates the virtual code from which user information can be extracted, it provides the effect that user information is not leaked even when the virtual code is leaked.

Fourth, because a virtual code generation function is stored in the virtual code generation device that generates the virtual code, and an algorithm for verifying the virtual code is added to a virtual code verification device that extracts the UID using the virtual code and verifies whether the virtual code is a normal code, leakage of algorithms for generating and verifying virtual codes may be prevented.

In the above, embodiments of the present invention have been described with reference to the accompanying drawings, and those of ordinary skill in the art to which the present invention pertains will be able to understand that the present invention can be implemented in other specific forms without changing the technical spirit or essential features. Therefore, it should be understood that the embodiments described above are illustrative and non-limiting in all respects.

The invention claimed is:

1. A transaction method using virtual code, the method comprising:
   receiving, by a virtual code verification device, via a wireless communication, from a virtual code generation device, a virtual code, which is generated by a virtual code generation function included in the virtual code generation device, wherein the virtual code verification device and the virtual code generation device are connected via the wireless communication;
   searching, by the virtual code verification device, for a storage location of a User Identification (UID) in the virtual code, wherein the storage location indicates a point on a track of a storage location search algorithm, and the point corresponds to a time point when a user requests a registration of the UID;
   searching, by the virtual code verification device, for control command information stored in memory of the virtual code verification device by matching with the UID;
   performing a control command based on the control command information;
   storing a plurality of UIDs in the memory of the virtual code verification device and also in memory of the virtual code generation device;
   matching the control command information with a first UID of the plurality of UIDs during a first preset period; and
   changing the control information to be matched with a second UID of the plurality of UIDs during a second preset period.

2. The method of claim 1, further comprising, for each preset period, updating, by the virtual code verification device, period information stored in the virtual code verification device,
   wherein, when the virtual code verification device updates the period information, the control command information matched to each of the plurality of UIDs and stored is matched to different UIDs and stored.

3. The method of claim 2, further comprising verifying, by the virtual code verification device, the virtual code using the stored period information.

4. The method of claim 3, wherein the verifying of the virtual code comprises:
   extracting period information from the virtual code by the virtual code verification device; and
   verifying, by the virtual code verification device, a validity of the virtual code by comparing the extracted period information with the period information stored in the virtual code verification device.

5. The method of claim 4, wherein the updating, by the virtual code verification device, the period information stored in the virtual code verification device comprises:
   updating, by the virtual code verification device, period information from a first period to a second period; and
   changing, by the virtual code verification device, a storage location of control command information so that control command information stored by matching a specific UID in the first period matches a UID different from the specific UID in the second period.

6. The method of claim 5, wherein the verifying of the virtual code comprises, if the extracted period information does not match the second period stored in the virtual code verification device, checking, by the virtual code verification device, whether the extracted period information matches the first period.

7. The method of claim 6, wherein, if the extracted period information and the first period match, the performing of the control command based on the extracted control command information comprises performing, by the virtual code verification device, a control command corresponding to the stored control command information by matching the UID in the first period.

8. The method of claim 1, wherein the virtual code comprises:
   a first code for setting a starting point of the storage location search; and
   a second code for setting a search path from the starting point to the storage location according to a specific search method.

9. The method of claim 3, wherein the verifying, by the virtual code verification device, the virtual code comprises:
   extracting, by the virtual code verification device, a unique value of the virtual code verification device from the virtual code; and verifying, by the virtual code verification device, a validity of the virtual code by comparing the extracted unique value with the unique value stored in the virtual code verification device.

10. A non-transitory computer readable medium coupled with a hardware processor, storing a transaction program using a virtual code, the transaction program including instructions to execute the method of claim 1.

11. A virtual code generation device for transactions, the device comprising:
   a processor configured to:
      match control command information corresponding to a purchase request of a user among a plurality of User Identifications (UIDs) stored in the virtual code generation device and generate one or more detail codes based on the UIDs;
      generate a virtual code by combining the one or more detail codes using a virtual code generation function; and
      transmit, via a wireless communication, the virtual code to a virtual code reception device or a virtual code verification device, wherein the virtual code generation device is connected with the virtual code reception or the virtual code verification device, via the wireless communication,
   wherein the virtual code generation device stores a plurality of UIDs, matches control command information with a first UID of the plurality of UIDs during a first preset period, and changes the control command information to be matched with a second UID of the plurality of UIDs during a second preset period.

12. The device of claim 11, wherein the virtual code generation device matches and stores control command information stored by matching each of the plurality of UIDs to different UIDs in the same period as the virtual code verification device.

13. A virtual code verification device for transactions, the device comprising:
   a processor configured to:
      receive, via a wireless communication, from a virtual code generation device, a virtual code, wherein the virtual code verification device and the virtual code generation device are connected via the wireless communication;
      extract a detail code from the virtual code;
      search a storage location of a User Identification (UID) based on the detail code, wherein the storage location indicates a point on a track of a storage location search algorithm, and the point corresponds to a time point when a user requests a registration of the UID;
      match the UID and extract stored control command information;
      verify the virtual code; and
      perform control based on the extracted control command information,
   wherein the virtual code verification device stores a plurality of UIDs, matches control command information with a first UID of the plurality of UIDs during a first preset period, and changes the control command information to be matched with a second UID of the plurality of UIDs during a second preset period.

14. The device of claim 13, wherein the virtual code verification device matches and stores control command information stored by matching each of the plurality of UIDs to different UIDs in the same period as the virtual code verification device.

15. The device of claim 13,
   wherein the processor is further configured to:
      extract period information from the virtual code; and
      compare the extracted period information with the period information stored in the virtual code verification device to verify a validity of the virtual code.

16. The method of claim 1, where the receiving comprises:
   receiving, by the virtual code verification device, via the wireless communication, via a virtual code reception device, from the virtual code generation device, the virtual code, which is generated by the virtual code generation function included in the virtual code generation device, wherein the virtual code verification device, the virtual code reception device, and the virtual code generation device are connected via the wireless communication.

17. The method of claim 1, where the receiving comprises:
   receiving, by a virtual code reception device, the virtual code from the virtual code generation device;
   displaying, on the virtual code reception device, the virtual code; and
   receiving, by the virtual code verification device, a user input of the virtual code.

18. The method of claim 1, where the receiving comprises:
   printing, by the virtual code generation device, the virtual code; and
   receiving, by the virtual code verification device, a user input of the virtual code.

* * * * *